(12) United States Patent
Winther et al.

(10) Patent No.: US 8,939,043 B2
(45) Date of Patent: Jan. 27, 2015

(54) LINEAR ACTUATOR

(75) Inventors: Henrik Winther, Nordborg (DK); Torben Iversen, Nordborg (DK); Juan Miguel Galindo Torres, Sønderborg (DK)

(73) Assignee: Linak A/S, Nordborg (DM)

( * ) Notice: Subject to any disclaimer, the term of this patent is extended or adjusted under 35 U.S.C. 154(b) by 210 days.

(21) Appl. No.: 13/509,318

(22) PCT Filed: Nov. 11, 2010

(86) PCT No.: PCT/DK2010/000148
§ 371 (c)(1), (2), (4) Date: May 11, 2012

(87) PCT Pub. No.: WO2011/057632
PCT Pub. Date: May 19, 2011

(65) Prior Publication Data
US 2012/0222510 A1  Sep. 6, 2012

(30) Foreign Application Priority Data

Nov. 13, 2009 (DK) .................................. 2009 01215

(51) Int. Cl.
*F16H 19/02* (2006.01)
*H02K 7/06* (2006.01)
(Continued)

(52) U.S. Cl.
CPC .................. *H02K 7/06* (2013.01); *F16H 25/20* (2013.01); *H02K 7/1166* (2013.01);
(Continued)

(58) Field of Classification Search
CPC .................. F16H 2025/2084; F16H 2025/209; F16H 25/20; F16H 2025/2031; F16H 2025/2037; H02K 7/06

USPC .................. 74/89.35, 89.38, 425, 424.71
See application file for complete search history.

(56) References Cited

U.S. PATENT DOCUMENTS 3,132,532 A * 5/1964 Polanin .......................... 74/586
4,583,421 A   4/1986 Rose
(Continued)

FOREIGN PATENT DOCUMENTS

DE          9404383      6/1994
DE     202004000950      5/2004
(Continued)

OTHER PUBLICATIONS

English Abstract of DE 202004000950.

*Primary Examiner* — David M Fenstermacher
(74) *Attorney, Agent, or Firm* — Dykema Gossett PLLC

(57) ABSTRACT

Linear actuator comprising a housing (1) consisting of at least two parts (1 *a*, 1 *b*) a mounting console (2) a reversible motor (7) with a transmission (22), a spindle (5) which over the transmission is driven by the motor, a bearing (16) for embedding the spindle (5), a spindle nut (6) secured against rotation on the spindle, an outer tube (3) which surrounds the spindle, an activation element (4) telescopically mounted in the outer tube (3) and connected to the spindle nut (6), a front mounting (8) on the outer end of the activation element (4), a rear mounting (9) arranged in the housing. In the rear mounting (9) is a seat for the bearing (31) of the spindle. The motor (7), the transmission (22) and the outer tube (3) is secured to the console (2). The mounting console (2) is constructed as a separate element around which the two parts (1*a*, 1 *b*) of the housing is assembled and the mounting console (2) constitutes alone the bearing chassis of the actuator. Thus a possibility for a compact actuator with low manufacturing costs together with high performance and quality properties is achieved.

11 Claims, 4 Drawing Sheets

(51) Int. Cl.
*F16H 25/20* (2006.01)
*H02K 7/116* (2006.01)
*H02K 5/22* (2006.01)
*H02K 11/00* (2006.01)

(52) U.S. Cl.
CPC ............. *F16H 2025/2031* (2013.01); *F16H 2025/2037* (2013.01); *F16H 2025/2081* (2013.01); *H02K 5/225* (2013.01); *H02K 11/0084* (2013.01)
USPC ............................ 74/89.37; 74/425; 74/89.38

(56) References Cited

U.S. PATENT DOCUMENTS

| | | | | |
|---|---|---|---|---|
| 4,790,201 A | * | 12/1988 | Gheddo | 74/89.37 |
| 4,858,481 A | * | 8/1989 | Abraham | 74/89.38 |
| 5,205,004 A | | 4/1993 | Hayes et al. | |
| 5,809,833 A | * | 9/1998 | Newport et al. | 74/89.37 |
| 5,865,272 A | * | 2/1999 | Wiggins et al. | 185/40 R |
| 5,895,992 A | | 4/1999 | Dreher | |
| 6,158,295 A | | 12/2000 | Nielsen | |
| 6,259,175 B1 | * | 7/2001 | Alfano et al. | 310/20 |
| 7,066,041 B2 | * | 6/2006 | Nielsen | 74/89.35 |
| 7,533,591 B2 | * | 5/2009 | Wang | 74/89.39 |
| 7,779,973 B2 | * | 8/2010 | Ko | 188/300 |
| 8,210,064 B2 | * | 7/2012 | Ku | 74/89.39 |
| 8,302,227 B2 | * | 11/2012 | Jensen | 5/616 |
| 8,308,603 B2 | * | 11/2012 | Knudsen et al. | 475/331 |
| 8,358,096 B2 | * | 1/2013 | Bastholm | 318/626 |
| 8,448,540 B2 | * | 5/2013 | Chiang et al. | 74/606 R |
| 8,516,914 B2 | * | 8/2013 | Osterlanger et al. | 74/89.39 |
| 2009/0140586 A1 | | 6/2009 | Fukano et al. | |
| 2010/0139428 A1 | | 6/2010 | Roither et al. | |

FOREIGN PATENT DOCUMENTS

| | | |
|---|---|---|
| EP | 531247 | 3/1993 |
| EP | 586326 | 3/1994 |
| EP | 647799 | 4/1995 |
| EP | 662573 | 7/1995 |

* cited by examiner

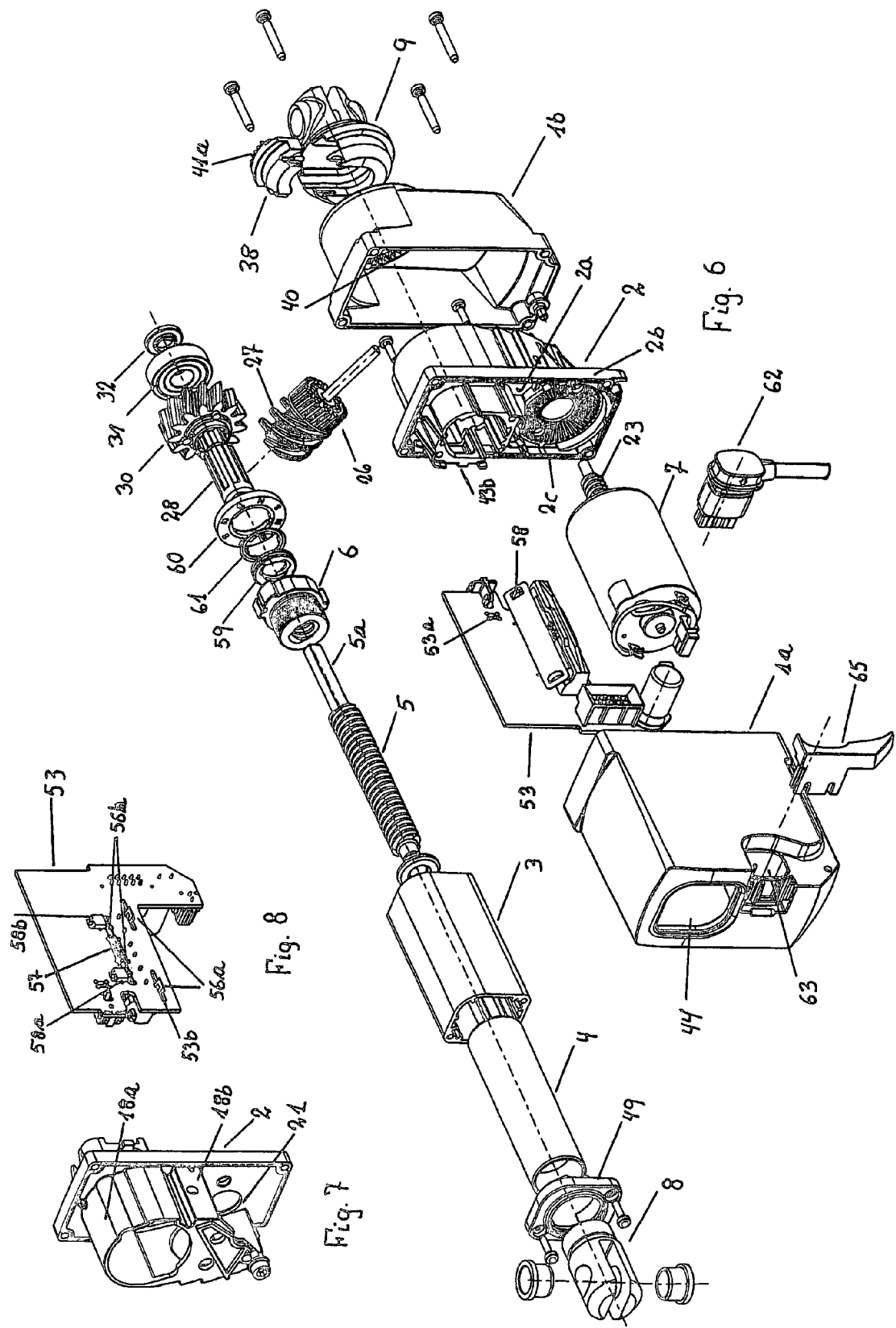

LINEAR ACTUATOR

BACKGROUND OF THE INVENTION

1. Field of the Invention

The present invention relates to a linear actuator.

2. The Prior Art

Actuators of this type are known i.e. from EP 531 247 A1, EP 586 326 A1, EP 647 799 and EP 662 573 A1 all of them to Linak NS. The forces of the spindle are transmitted to a compression/tension bearing embedded in a plastic housing. The forces between the bearing and the rear mounting are transmitted through the plastic housing which has to be dimensioned and shaped accordingly. Such a plastic housing represents a significant portion of the total cost of the actuator. WO 98/30816 to Linak NS discloses an example of a sophisticated actuator with very high performance in which the forces between the bearing and the rear mounting are transmitted via a metal chassis. The actuators are used for i.e. incorporation in furniture, e.g. hospital and nursing beds for which it is required that the actuators can withstand moisture and water. As for instance mentioned in EP 488 552 A1 Huntleigh Technology plc concerning a hospital bed. Since the actuators are fully or partly exposed it is an additional requirement that the actuators have a minimum of design with smooth and filth-repelling surfaces.

A non-design heavy-duty actuator without a housing for industrial purposes is based on a bearing metal housing with an integrated rear mounting from which the forces are transmitted.

An actuator of this type is known from DE GM 94 04 383.3 U1 with the housing being of die-cast zinc is equipped with a cylindrical portion in which the motor is located, said cylindrical portion being closed by means of a cover. Furthermore, the actuator is waterproof, if it is provided with appropriate sealing which makes it suitable for beds in the hospital and care sector. The die-cast zinc housing being relatively large as the motor has to be build in it, makes the solution relatively expensive.

EP 0 831 250 A2 Dana Corp discloses an actuator with a housing, having a shell which surrounds the motor and the transmission. The shell being open in the rear i.e. towards the rear mounting of the actuator is closed with a cover. In front, i.e. towards the spindle, the shell is equipped with a mounting for the outer tube which serves as guide for the spindle nut and as guide for the outer end of the tube shaped activation element being secured to the spindle nut. The lateral load which after all appear on the activation element and thus on the spindle are transmitted through the outer tube to the housing. However, it is also stated that the housing and the outer tube are made from a rigid material and as an example is stated i.e. aluminium, zinc alloys and stainless steel, i.e. the stated plastic materials: nylon containing glass fibre, polyvinylchloride and polyethylene all having a corresponding rigidness. All things considered a rather expensive solution.

WO 02/29284 A1 Linak A/S discloses an actuator in which a console is secured to the front part of the motor such that the electric motor and the console appear to be the bearing chassis of the motor while the housing is functioning as a dust and watertight cover, however, forces as such are not transmitted through the housing.

The object of the invention is to provide a compact actuator of the first mentioned type which is inexpensive to manufacture, but meets the requirements of these when it comes to output and quality.

SUMMARY OF THE INVENTION

This is achieved according to the invention in that the actuator includes a mounting console constructed as a separate element around which the two parts of the housing are mounted and the mounting console alone constitutes the bearing chassis of the actuator. The mounting console can be constructed with the sole purpose of being able to withstand and/or transmit the forces occurring in consequence of the parts which are mounted on the mounting console and besides be constructed as compact as possible. Therefore, there are no particular strength demands on the housing, which means that no particular considerations have to be taken as far as manufacturing and the shaping concerns. As a consequence of this, the material thickness can be made thin and strengthening ribs are not strictly necessary resulting in a simpler mould as well as a simplified manufacturing process. Furthermore, plastic materials with lower strength can be chosen which is cheaper and also an advantage in the manufacturing process.

A particular compact embodiment of the actuator can be achieved by positioning the motor parallel to the spindle and particularly along a shaft end of the spindle.

The housing may of course be constructed of more parts; however, it is appropriate in terms of assembly and logistics if the housing is made of two parts only. The mounting plane may be positioned in the axial direction, but it is attractive that mounting planes are located perpendicular on the longitudinal axis of the spindle. It provides the possibility for shaping the two parts of the housing as half shells which can be assembled around the mounting console. This differs from the construction in U.S. Pat. No. 5,809,833 Dana Corp, where the housing is made of only one cup-shaped shell to be closed with a cover.

In a particular expedient embodiment, the mounting console is equipped with a rigid wall element around which and upon which the housing of the actuator, the electric motor, the transmission and the outer tube are mounted. This makes it possible to mount the individual components on each side of the wall element and a fairly balanced force and weight distribution on the wall element is achieved.

By constructing the outer outline of the mounting console consistent with or basically consistent with the outer shape of the cross section of the housing it is possible to make the mounting console coincide with the outer side of the housing, which provides an attractive design as well as a smooth and cleaning-friendly surface.

Dependent of the chosen type of transmission it can be secured on the mounting console in different ways. In case of a toothed belt drive, a belt pulley on the motor shaft and at the end of the spindle will be sufficient. When using a gear with parallel axles, the gear wheels may also be secured directly to the mounting console. However, if the transmission is a little more complicated it would be suitable to construct a housing for the transmission on the mounting console.

The outer tube can be secured to the console in different ways, for example it can be secured directly with screws to the mounting console or be led into a tube shaped socket constructed on the mounting console and retained by snap locking means. In a particular embodiment the mounting console is equipped with a tube shaped socket, of which the inner and outer shape are consistent with, or basically are consistent with, the inner and outer shape of the outer tube causing this to be positioned on a free edge of the tube shaped socket. The tube shaped socket will then function as an extension of the outer tube into the console. This is particularly important for axially running guides in the outer tube. In this embodiment it is suitable to secure the outer tube in the mounting console with screws as the outer tube is furnished with screw channels for this purpose.

The actuator can be stopped in the outer position of the activation element in different ways i.e. by means of mechanical end stops in connection with detecting of an overcurrent, detecting of the position of the activation element by means of potentiometers, Hall elements, magnetic or optical encoders, but typically, end stop switches are preferred for safety reasons. In an embodiment the actuator comprises a circuit board with end stop switches mounted on the side of the tube shaped socket and on the circuit board is mounted a slider with an arm for activation of the end stop switches, where the spindle nut in an inner end position affects the arm on the slider and that in the outer tube there is an axially displaceable embedded rod which is mounted to the arm at the one end, while the other end has a stop collar affected by the spindle nut in the other end position. The possibility for a compact structure in combination with the possibility for a relative large circuit board is provided when the circuit board is being mounted edgewise on the side of the actuator.

The rear mounting could be constructed as an integrated part of the housing; however, it has proven to be most expedient to construct it as a separate part which makes the spindle with the gear, the bearing and the rear mounting appear as one unit, ready to be mounted in the actuator. An attractive construction is designed in such a way that a seat for the bearing of the spindle is connected to an opening on the side of the rear mounting. Thus, the rear mounting can be extended sideways over the bearing of the spindle and is thus secured. In order to prevent the rear mounting from unintentionally falling off, the opening could be constructed slightly narrowed so that the rear mounting has to be pressed over the bearing. Another possibility is to block the opening with a closing element.

The rear mounting can be mounted in the housing in different ways, e.g., incorporated between shaped wall elements in the housing. In a particularly simple construction, the rear mounting is fixed between the housing on the mounting console and an end wall on the rear part of the housing. It should be remembered that when the bearing of the spindle is located in the rear mounting the axial forces are led directly through the rear mounting to the construction in which the actuator is mounted. Thus, the rear mounting is not particularly exposed to transverse forces in the housing. However, the transverse forces which may occur are directly transmitted to the mounting console.

BRIEF DESCRIPTION OF THE DRAWINGS

An embodiment according to the invention will be explained more fully below with reference to the accompanying drawing.

FIG. 6 shows a exploded view of the actuator shown from the front,

FIG. 7 shows a perspective view of the mounting console shown from the rear from the opposite side, as shown in FIG. 3, and FIG. 8 shows the circuit board shown from the opposite side and end as shown in FIG. 3.

DETAILED DESCRIPTION OF THE PREFERRED EMBODIMENT

Figure 1:
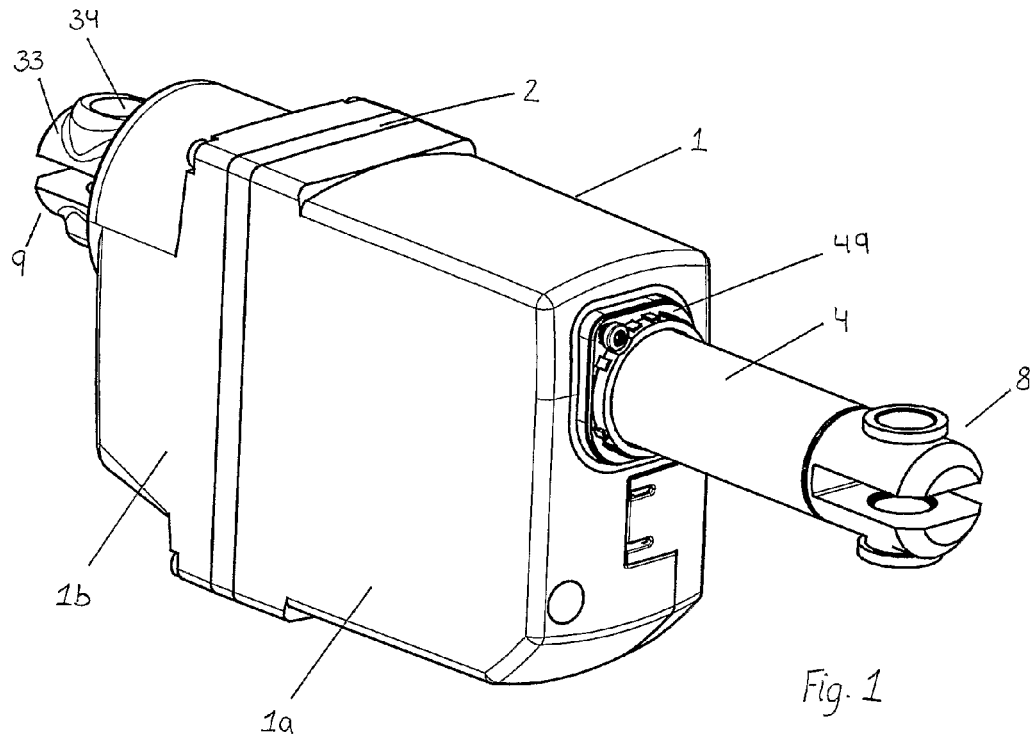
FIG. 1 shows a perspective view of the actuator shown from the front.
Figure 2:
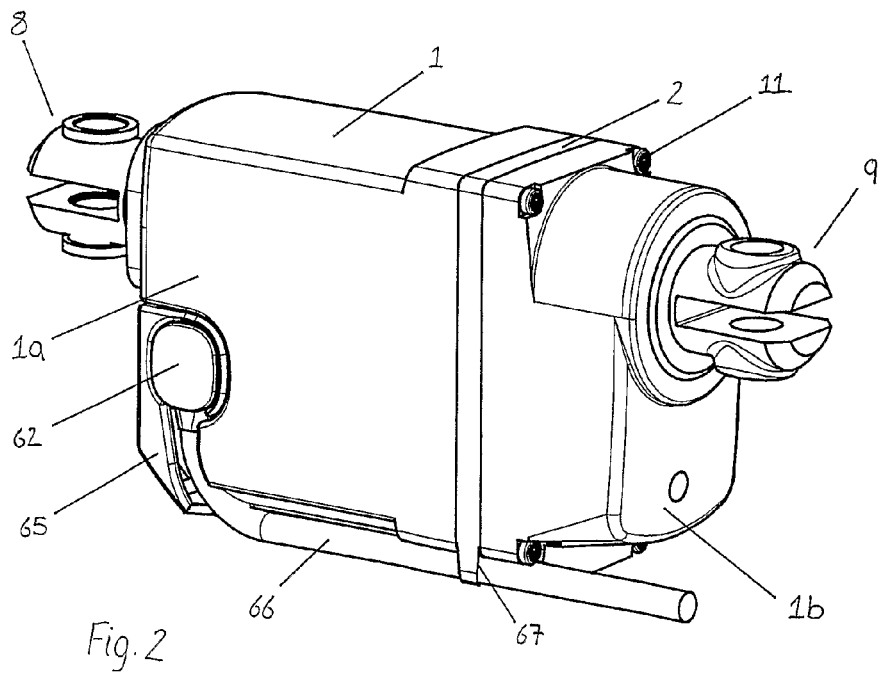
FIG. 2 shows a perspective view of the actuator shown from the rear.
Figure 3:
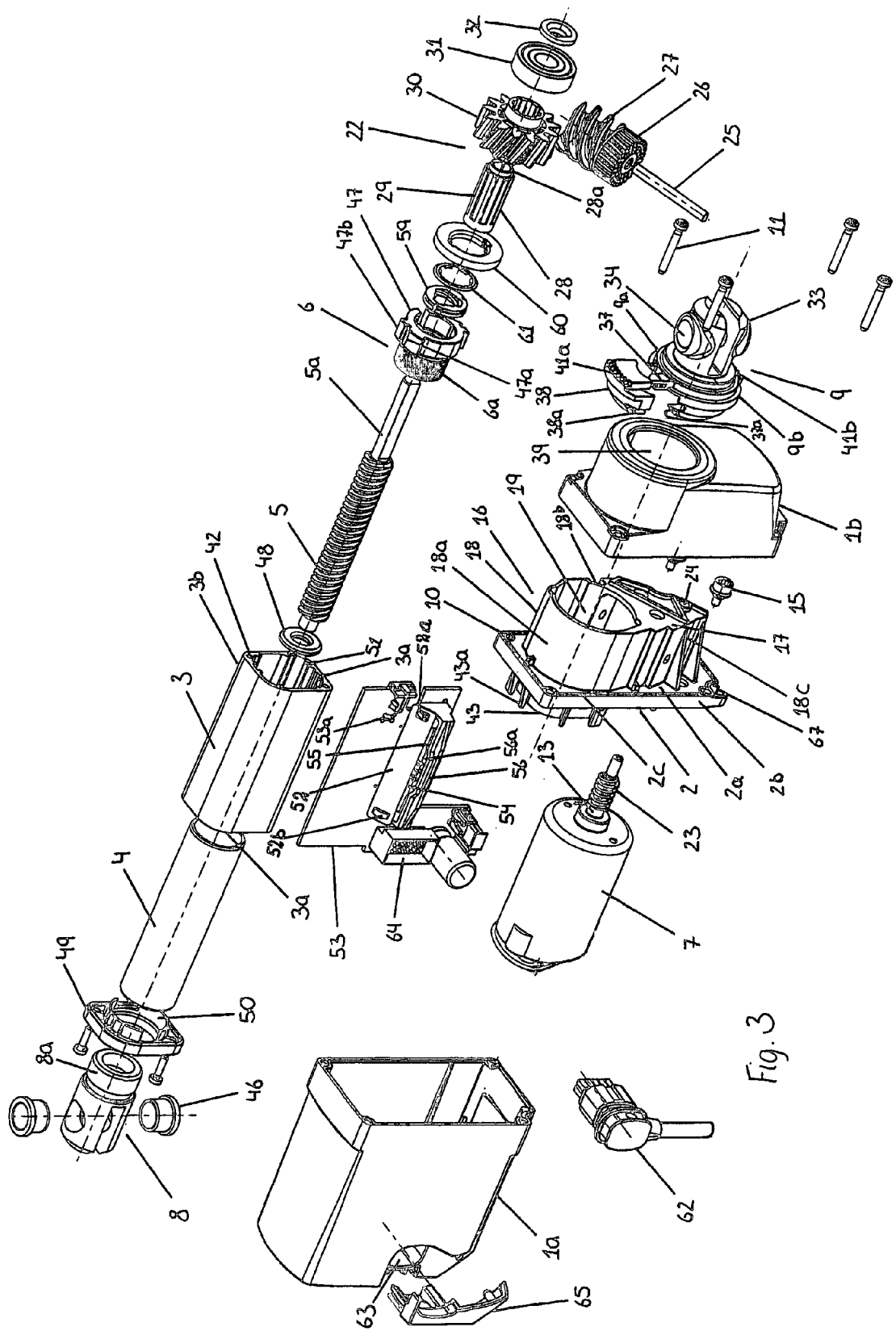
FIG. 3 shows a exploded view of the actuator shown from the rear.

The main components of the actuator shown on the drawing comprise a two-part outer housing 1, a mounting console 2, an outer tube 3 secured to secured to the mounting console 2 with a rear end, and in which a telescopic tube shaped activation element 4 (in technical terminology an inner tube), a spindle 5 with a spindle nut 6 to which the activation element 4 is mounted with a rear end, a reversible low voltage DC motor 7, a front mounting 8 secured to a free front end of the activation element 4 and a rear mounting 9 at a rear end of the outer housing 1.

The two-part outer housing 1 comprises a front part 1a and a rear part 1b assembled around the mounting console 2, having a cross wall 2a with a circumferential flange 2b, and where the exterior of the flange corresponds to the outer contour of the housing 1. Along the outer side of the circumferential flange 2b at each side a grove 2c for a sealing is arranged. In the corners are through holes 10 for screws 11. The two parts 1a,1b of the housing 1 are assembled around the mounting console 2 in each corner with the screws 11 at each corner which are inserted through the holes 10 in each corner of the mounting console 2. The screws are inserted from the rear part 1b and are screwed into the front part 1a of the housing.

Figure 4:
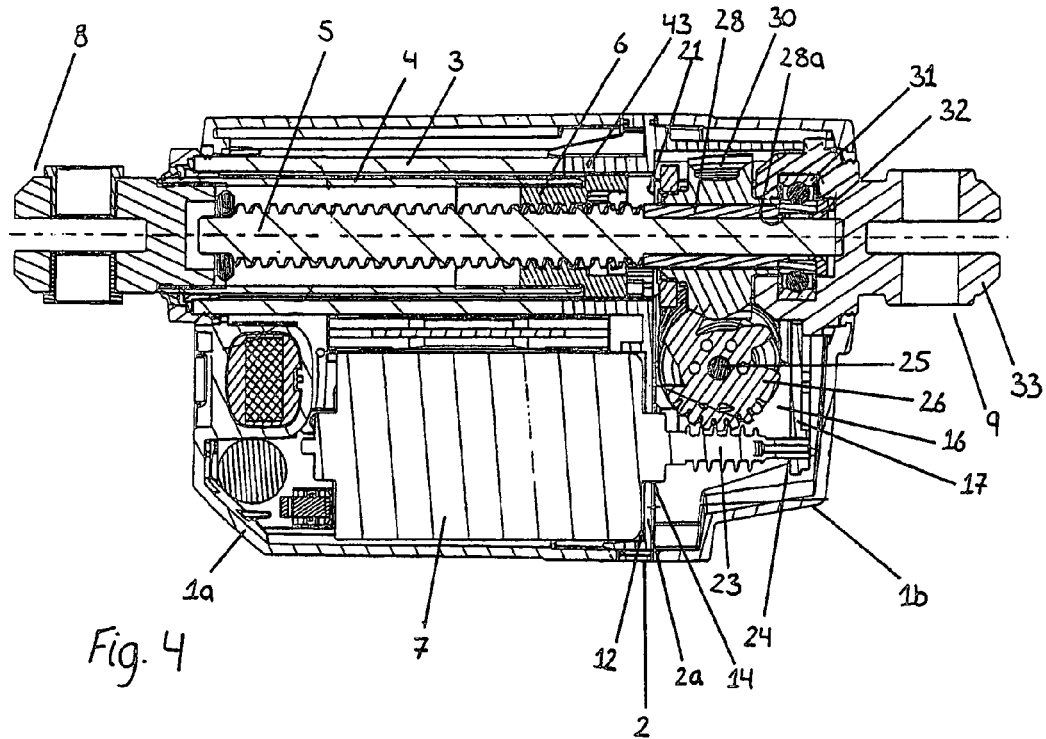
FIG. 4 shows a longitudinal section through the actuator shown from the side.
Figure 5:
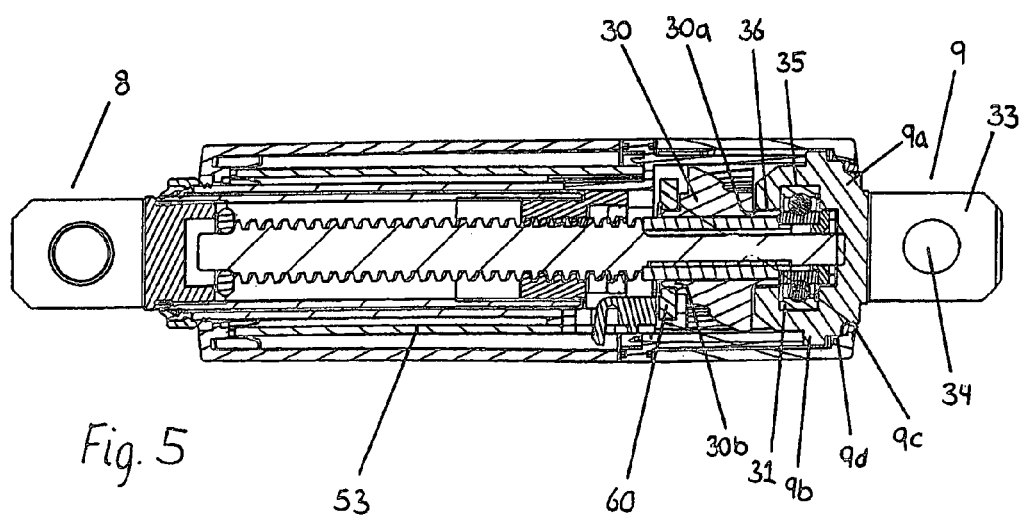
FIG. 5 shows a longitudinal section through the actuator shown from above.

At one side of the cross wall 2a of the mounting console there is a recess 12 (FIG. 4) for receiving the front part of the motor 7. The motor shaft 13 of the motor extends through a corresponding hole 14 in the mounting console 2. The motor 7 is mounted to the mounting console 2 with screws 15.

On the opposite side of the mounting console 2 a housing 16 with a first and a second end wall is mounted, where the one end wall is constituted by the cross wall 2a of the mounting console while the other end wall, the free end wall 17, is an independent wall at a distance from the cross wall 2a. Between the two end walls 2a, 17 is arranged a side wall 18, comprising a half circular wall element 18a which at its one end is extended into a short rectilinear wall element 18b and at the other end is extended into another longer rectilinear wall element 18c. In connection with the half circular wail element 18a in the free end wall is arranged a circular opening 19 which is connected to a circular opening 20 in the cross wall 2a of the mounting console. Likewise, the housing 16 has an opening 21 in the side wall between the two rectilinear wall elements 18b,18c.

A transmission 22 mounted in the housing 16 comprises a first worm gear the worm 23 of which is secured to the motor shaft 13. The free end of the worm is embedded in a hole 24 functioning as a slide bearing in the free end wall 17 of the housing. Crosswise of the worm 23 a gear unit with a through going axle 25 is arranged. Said axle 25 is embedded with its ends in the two rectilinear wall elements 18b,18c and inclined in the housing 16. In one end, the gear unit is equipped with at worm wheel 26 brought into mesh with the worm 23 at the motor shaft 13. The remaining part of the gear unit is constructed as a second worm 27 with a large thread. The gear unit is led into the housing 16 through the opening 21 in the side wall 18 of the housing.

A shaft end 5a of the spindle is shaped as a D-spline upon which a bushing 28 is arranged. On the bushing 28 is arranged a worm wheel 30 with a large thread brought into mesh with the worm 27 with the large thread on the gear unit by means of a spline connection 29. Thus, the spindle 5 is driven by the motor 7 over a transmission with two worm gears 23,26;27,30 where one of the worm gears 26 and one of the worms 27 are moulded as a plastic component in one piece. Furthermore, the worm wheel 30 on the spindle 5 is also made of plastic. In that way a large gearing in the transmission is achieved, likewise, it is self-locking and thus prevents or locks the spindle 5 against rotation when the load on the activation rod 4 attempts to rotate the spindle 5.

On the outer end of the spindle 5 up against the worm wheel 30 a ball bearing 31 is located, which with one side is extended over a stepped down end 28a of the bushing 28. On the other side, the free side of the bearing 31, a disc 32 with a D-shaped opening which extends over the end of the spindle is located. The disc 32 is equipped with a hub protruding into the opening of the ball bearing and stabilises it. The outer end of the spindle 5 is shaped as a rivet head for retaining the disc 32 and the bushing 28 on the D-shaped shaft end 5a of the spindle 5.

The rear mounting 9 is furnished with a circular part 9a, the outer end of which, the free end, is here equipped with a fork fitting 33 having a through hole for a bolt or a shaft piece, but it might as well have been a flange with a through hole. On the opposite side, the inner side of the rear mounting 9, protruding into the housing 1 a recess 35 which is shaped as a seat for the ball bearing is located. This recess 35 is connected to an opening 36 functioning as a seat for a cylindrical collar on the rear side of the worm wheel 30 (FIG. 6), The recess 35 for the ball bearing 31 31 and the opening 36 for the cylindrical collar 30a on the worm wheel 30 is connected to an opening 37 on the side of the rear mounting 9 such that it can be extended sidewards over the ball bearing 31 and the collar 30a worm wheel 30. The opening 37 may be closed by means of an arc-shaped closing element 38 which with a tongue 38a at each side fits into a spline 37a at the side of the opening 37. The closing element 38 is designed as a section in the circular part 9a of the rear mounting 9. The circular part 9a of the rear mounting fits into the circular opening 19 of the free end wall 17 of the housing 16 of the mounting console 2 and abuts the rim of the circular opening 19 with the edge of a circular collar 9b which moreover functions as a stop for how far the circular part 9a of the rear mounting 9 extends into the housing 16. As the spindle 5 with the ball bearing 31 is embedded in the rear mounting 9 the position of the spindle in proportion to the mounting console 2 is thus precisely determined.

At the back end of the rear part 1b of the housing 1a circular hole 39 is located through which the rear mounting 9 with the fork fitting 33 extends. Internally in the housing on the rim along the opening 39, a row of teeth 40 is arranged more precisely forty-eight teeth. At the rear mounting 9 in connection with the circular collar 9b is arranged a stepping with two steps, of which the first step 9c is extended through the opening 39 of the housing while at the other step 9d two mutually facing sections 41a,41b with teeth are arranged corresponding to the teeth 40 at the opening 39 of the housing. One of the sections with teeth 41a is arranged at the closing element 38. The arrangement of teeth allows the rear mounting and thus the fork fitting 33 can be rotated into a random angle position with intervals of 7.5°.

The outer tube 3 is composed of a an aluminium tube with an almost square cross section as two diametrically located edges 3a are shaped as a as a soft circular arc while the two other edges 3b are sharper i.e. with a a smaller radius of curvature. In each of these two corners 3b a screw channel 42 is arranged. The inner end, the end of the tube 3 protruding farthest into the housing, is riding at the edge of a tube shaped socket 43 43 on the mounting console 2. Basically, the tube shaped socket 43 is shaped in accordance with the shape of the outer tube 3. The outer tube 3 tube 3 is fastened to the mounting console 2 by means of screws which are are screwed into the screw channels 42 of the outer tube 3 from the opposite side of the mounting console 2. In order to be able to guide the outer tube during the mounting process, the outer side of the tube shaped shaped socket 43 is equipped with a number of guide pins 43a. The outer outer tube 3 extends with its outer end through an opening 44 in the front of the front part of the housing. In order to prevent penetration of water between the outer tube and the housing a sealing is arranged in the opening.

The activation element 4 comprises a tube section the inner end of which, i.e. the end located inside the housing comprises an inner threaded part by means of which it is screwed onto the spindle nut 6 the outer side of which for the purpose is equipped with a thread 6a. The front mounting 8 is secured to an outer end of the activation element 4, i.e. the end of the tube section which is extended out of the front part of the housing 1. The front mounting 8 is here equipped with a fork fitting 45 with a through hole comprising two bushings 46 for a mounting bolt or a shaft, it might as well be constructed as a butt strap with a through hole just like the rear mounting. The other end of the front mounting 8 is constructed as a threaded part 8a by which it is screwed onto the tube section 4 which for the purpose is equipped with an inner thread. The position of the fork fitting can be adjusted stepless by simply turning the tube section 4 in its thread on the spindle nut. The thread coupling between the front mounting 8 and the tube section 4 is sealed so that water cannot penetrate into the actuator this way.

For guidance of the inner end of the tube shaped activation element 4 in the outer tube 3, the spindle nut 6 is partly furnished with a neck 47, partly with guide surfaces 47a which are guiding against the inner side of the outer tube 3, and partly with guide bosses 47b which are guiding in axially running guides 3a, constructed for the purpose, inside the outer tube.Moreover, the guide bosses 47b function together with the guide surfaces 47a as rotation protection for the spindle nut 6 so this is secured against rotation and thus will be moved in and out on the spindle 5 dependent of the direction of rotation of the spindle. To prevent the spindle nut 6 from moving off the spindle 5, i.e. over the front of the spindle a mechanical stop shaped as a secured circular disc 48 is mounted on the front of the spindle. At the front of the outer tube 3 an end plug 49 is fastened with screws which are screwed into the screw channels 42 in the outer tube 3. The end plug 49, which moreover is sealed against the end of the outer tube 3, has a central opening 50 for the tube shaped activation element 4 which is functioning as a guide for it. The activation element 4 is thus guided in the outer tube 3 both at its rear end and at the front of the outer tube. The opening of the end plug 49 is equipped with seals in the form of o-rings for the activation element 4 to prevent water to penetrate into the actuator. One of the soft curved corners 3a of the outer tube 3 has two guides 51 for a strip shaped activation rod 52 which has an opening 52a at the rear part and a dog 52b in the form of an embossing at the front part. When the activation element 4 is brought into its outermost position, a guide boss 47b on the spindle nut 6 will hit the dog 52b and pull the activation rod 52 along until the motor stops.

At the front of the mounting console 2 edgeways at the side of the outer tube 3, a circuit board 53 with switches is arranged. The end of the circuit circuit board rests against the tube shaped socket 43 on the mounting console 2, and the front edge is fixed between its side and pins on the mounting console 2. The circuit board 53 has a hole 53a for insertion over a pin 43b at the side of the tube shaped socket 43 such that the circuit board 53 is secured in the axial direction as well as in the sideways direction. On the circuit board 53 two end stop switches 54, 55 are arranged below a longitudinal displaceable housing 56 which with a leg 56a at each end reaches into the guide 53b in the circuit board 53. The housing 56 is spring-loaded by a coil spring 57 to occupy a neutral position in which none of the end stop switches 54,55 are activated. The coil spring 57 is arranged in a groove in the circuit board. Each end of the groove is connected to a guide through which two tabs 56b are arranged on the housing between which the coil spring 57 is embedded. On one side of the housing 56 is an arm 58 which is extended into the hollow of the tube shaped socket 43 through an opening. The aforementioned strip shaped activation rod 52 in the outer tube 3 is attached to the arm 58 with the opening 52a. When the activation element 4 reaches its outermost end position the displacement of the activation rod 52 will pull the housing 56 along and activate the corresponding end stop switch 55. This happens in that the ceiling 56a of the housing is countersunk at the ends such that the contact on the end stop switch 55 is pressed down when it passes over the end stop switch 55. By activating the end stop switch 55 the motor will be stopped by switching off the power for it by means of guide electronics (not shown). At the inner retracted end position of the activation element 4 a guide boss 47a on the spindle nut 6 hits the arm 58 and thus pulls the housing 56 along and activates the other end stop switch 54. Again the power for the motor is switched off by the guide electronics. On the other side of the circuit board 53 two position switches 57a, 57b are arranged which will be activated by the tab 56b on the housing 56. These position switches signal to the control unit about which end position the activation element 4 is in. Note that the positions switches 57a, 57b are expendable if it is not necessary to know which end position the activation element 4 are in. Also note that the end stop switches 54, 55 can function as power switches which cut off the current to the motor 7 in order to simplify the guide electronics. However, it is often a strong wish that the mains voltage is kept as far from the actuator as possible for safety reasons.

Further, it is noted that if necessary the spindle nut 6 may be equipped with a metal safety nut 59, applied in a groove at the end of the spindle nut 6 which typically is made of plastic in order to dampen noise. When the actuator is only exposed to pressure load only one safety nut 59 at the rear end of the spindle nut 6 is required, and when the actuator is only exposed to tensile load, only a safety nut at the front of the spindle nut is required.

When the actuator is exposed to both pressure load and tensile load a safety nut can be arranged at each end.

The determination of the position of the activation element 4 may, as mentioned above, be done in different ways, e.g. with a Hall-element arranged on the printed circuit board 53. At a collar 30b at the front of the worm wheel 30 on the spindle 5 a magnet ring 60 with more poles is embedded, which triggers the Hall-element each time a pole passes it. The magnet ring 60 is retained in its position by a locking ring 61.

For the sake of completeness it is noted that 62 is a plug from the control device which is connected to the socket of the circuit board 64 through a gateway 63 in the outer housing. The gateway 63 is arranged in a countersunk area on the housing. To prevent the plug 62 from unintentionally being pulled out it can be locked by a locking element 65 which constitutes part of the front part 1a of the housing. At a lower edge of the housing 1, a groove shaped notch for a cable 66 for the plug 62. The cable 66 is secured by a clamp 67 arranged in the corner of the mounting console. The cable thus lies within the circumscribed rectangle of the housing and is thus properly protected.

The invention thus provides a linear actuator which provides the possibility of low manufacturing costs while the actuator still maintains a high quality and strength as well as a high degree of flexibility in terms of accessories and mounting brackets (front and rear mounting).

The invention claimed is:

1. A linear actuator which comprises:
    a housing provided by a front housing part, a rear housing part and a separate mounting console positioned between said front and rear housing parts and to which said front and rear mounting parts are mounted, said mounting console defining an outer peripheral flange at an out periphery of a cross wall that separates interiors of said front and rear parts, said front part defining a front opening in a front wall thereof and said rear part defining a rear opening in a rear wall thereof,
    a rear mount in said rear opening of said rear part, said rear mount including a spindle bearing,
    a spindle located in said housing and rotatably mounted in said spindle bearing,
    an outer tube which surrounds said spindle, said outer tube being mounted on said cross wall,
    a spindle nut non-rotatably mounted on side spindle,
    an activation element located in said outer tube and which extends from said spindle nut through said front opening,
    a front mount connected to said activation element exterior to said housing,
    a reversible motor mounted on said cross wall in said housing, said motor including a drive shaft, and
    a transmission mounted on said cross wall and connected between said drive shaft and said spindle to rotate said spindle with rotation of said drive shaft.

2. The linear actuator according to claim 1, wherein the reversible motor is mounted on the cross wall to extend in parallel with the spindle.

3. The linear actuator according to claim 1, wherein the spindle includes a shaft end and wherein the motor is located adjacent said shaft end.

4. The linear actuator according to claim 1, wherein the cross wall extends perpendicularly to a longitudinal axis of the spindle.

5. The linear actuator according to claim 1, wherein the rear mount is a separate element and retained between the housing on the mounting console and an end wall at rear end of the rear housing part.

6. The linear actuator according to claim 1, wherein the external surface of the outer peripheral flange of the mounting console is essentially flush with outer contours of adjacent front and rear housing parts.

7. The linear actuator according to claim 1, wherein the mounting console includes a compartment containing the transmission.

8. The linear actuator according to claim 1, wherein the mounting console includes a tube-shaped socket having inner and outer contours which corresponds to inner and outer contours of the outer tube, so that said outer tube stands on a free edge of the tube-shaped socket.

9. The linear actuator according to claim 8, wherein the outer tube includes screw channels and is secured to the mounting console with screws which extend into the screw channels.

10. The linear actuator according to claim 8, including a printed circuit board mounted on a side of the tube-shaped socket and includes end stop switches, a slider with an arm for activating the end stop switches, where the spindle nut in an innermost end position operates the arm on the slider, and an axially displaceable rod is embedded in the outer tube, which with one end is secured to the arm while the other end is equipped with a dog, which is operated by the spindle nut in its other end position.

11. The linear actuator according to claim 1, wherein the rear mounting includes a seat for the bearing of the spindle, and the seat is connected to an opening leading to a side of the rear mounting so that the bearing of the spindle may be inserted sideways into the seat.

\* \* \* \* \*